Dec. 8, 1959  A. T. FASSERO ET AL  2,915,783
TIRE VULCANIZING MOLDS

Filed Jan. 3, 1955  5 Sheets-Sheet 1

INVENTOR.
ANTHONY T. FASSERO
JAMES R. MADDOX
BY
George B. White
ATTY.

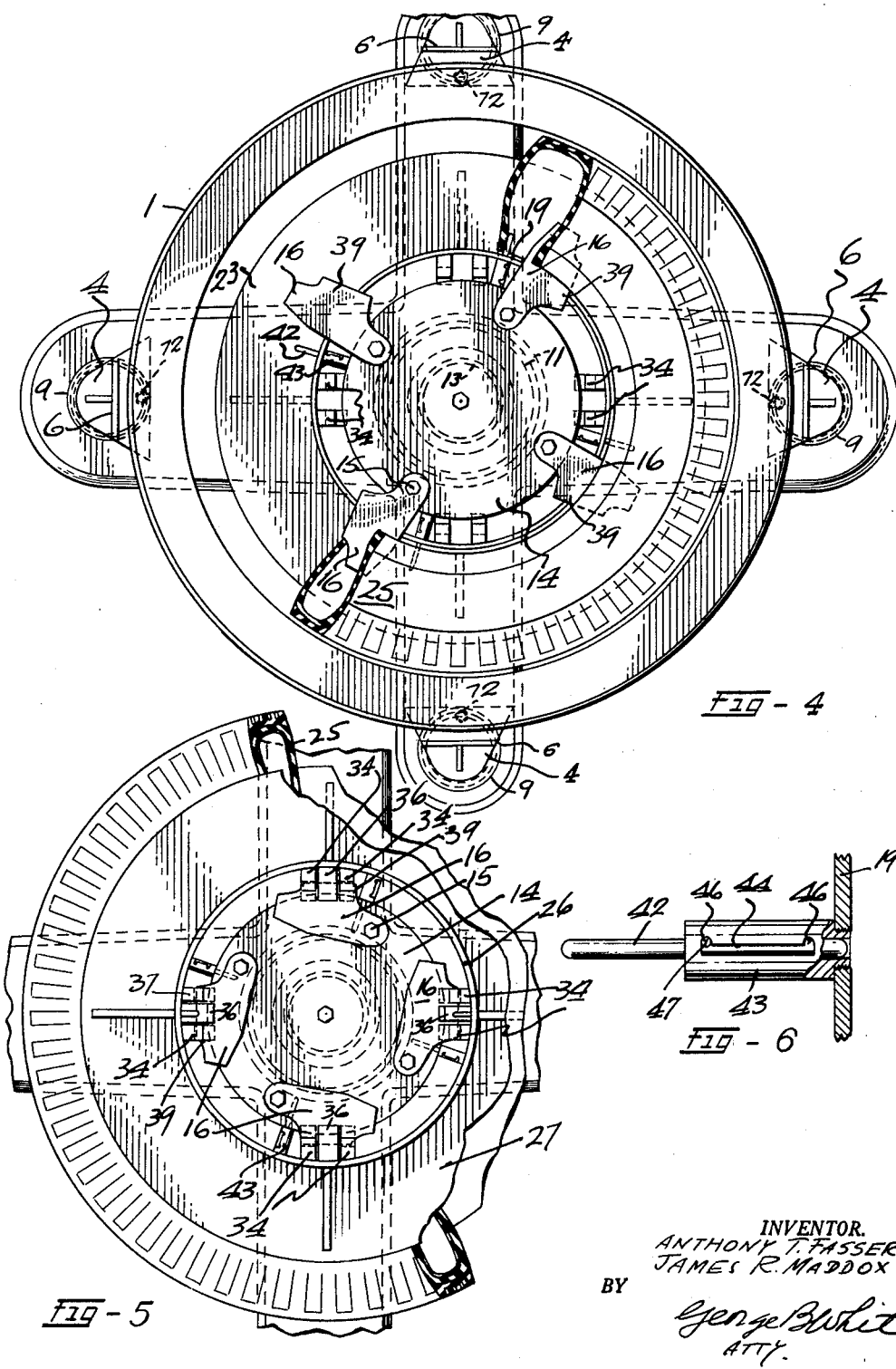

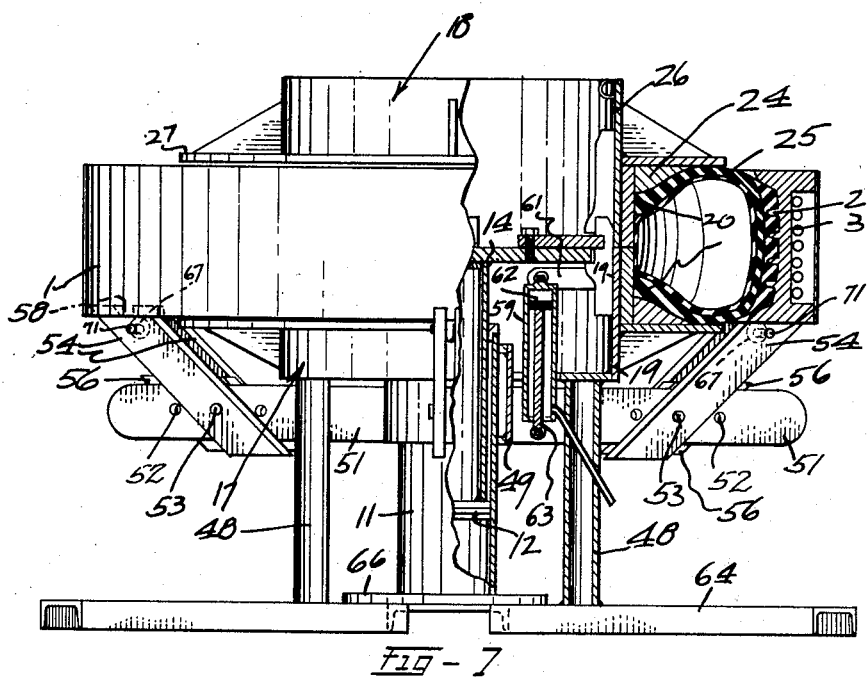

United States Patent Office 2,915,783
Patented Dec. 8, 1959

2,915,783

TIRE VULCANIZING MOLDS

Anthony T. Fassero and James R. Maddox, Oakland, Calif.

Application January 3, 1955, Serial No. 479,455

8 Claims. (Cl. 18—18)

This invention relates to a tire vulcanizing method and mold.

The primary object of the invention is to provide a method and a mold device wherein a continuous circular band can be easily moved over the exterior or tread portion of a tire carcass while the portions of the curing rim are utilized for the purpose of spreading the beads of the tire thereby contracting circumferentially the crown portion of the tire so as to facilitate the moving of the band over the tire.

Another object of the invention is to provide a mold for curing a tread on a tire casing wherein the tire beads can be spread and the tire circumferentially contracted while in the mold device and wherein a band mold can be quickly moved over the contracted tire casing and thereafter the curing rim sections may be locked together so as to exert directional pressure against the beads of the tire to assure full expansion of the tire into the tread designs of the mold.

Another object of the invention is to provide in combination with a band mold, means to move the same over the contracted circumference of the tire, means related to the mold support to hold the tire and to engage the beads of the tire so as to spread the same apart for reducing said tire's circumference, and a sectional curing rim adapted for quick insertion in the tire and quick adjustment for coaction either for the spreading of the beads together directionally respectively for contracting or expanding the tire circumference.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 4 is a plane view of the device with a part of the tire casing broken away to indicate the engagement position of the tire spreading fingers in position to engage interiorly the top bead of the casing.

Fig. 5 is a fragmental, partly sectional plane view showing the curing rim sections in position and locked together.

Fig. 6 is a fragmental partly sectional view of a portion of the lower section of the curing rim with the adjustable pins therein for selective engagement interiorly of the lower bead of the tire casing.

Fig. 7 is a partly cross-sectional view of a modified construction of our tire curing device.

Fig. 8 is a fragmental perspective view showing the modified curing band supporting arm, and Fig. 9 is a fragmental, partly sectional perspective view of the interior of the sections of the curing rim showing the rim interlocking device.

Figure 1:
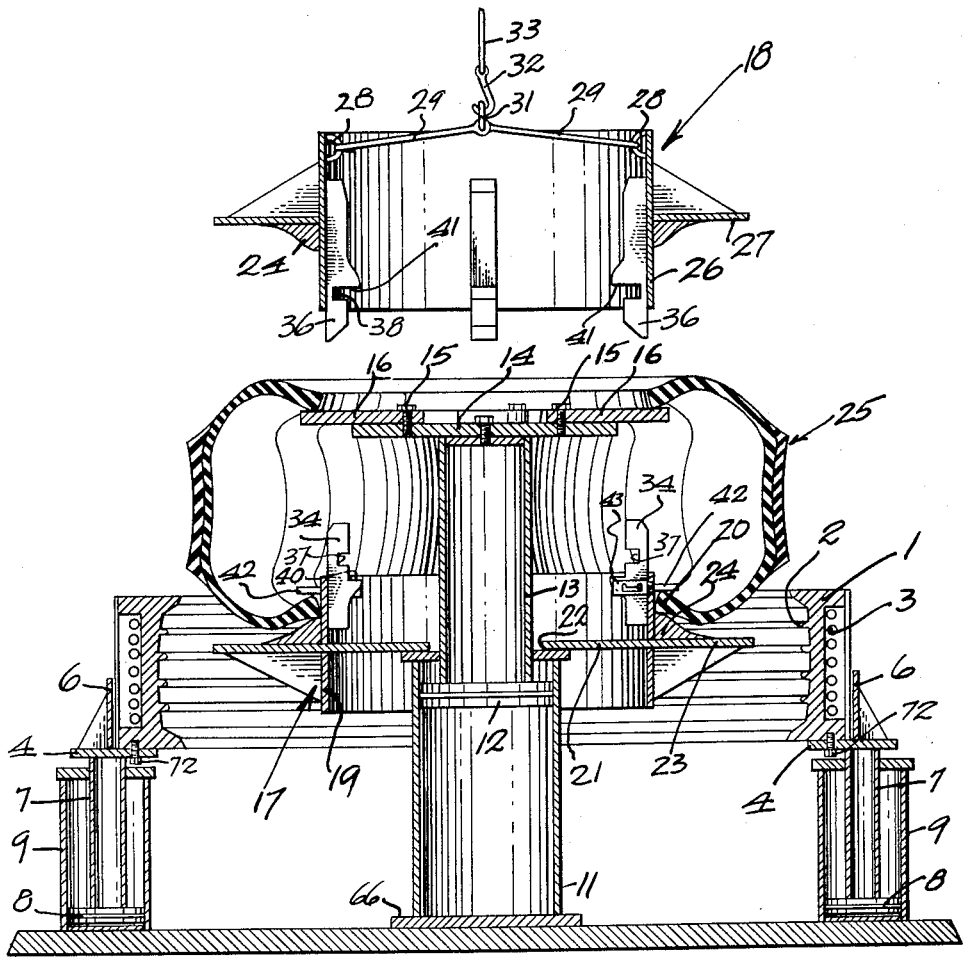
Fig. 1 is a sectional view of my mold device showing the curing rim combination with one part of the curing rim being used to aid in spreading the beads of the tire casing apart.

The herein method of placing a tire casing in a band mold or matrix includes engaging and holding one bead of the tire casing by a separable section of a curing rim on a fixed part of the mold, pushing the other bead away from the engaged bead, moving a mold band on said fixed part of the mold over the contracted tire casing, releasing the last mentioned bead to permit the tire to expand into the mold band, then lowering the complemental section of the curing rim inside the tire casing, engaging the exterior of the opposite tire beads of the tire casing by said rim sections and interlocking said rim sections to hold the beads and adjacent portions of the tire sides under pressure and to hold the casing expanded into said band, and holding said band and tire casing in said locked position on said fixed mold part during curing.

Our mold apparatus for curing tire casings includes a continuous band 1 on the interior circumference of which is formed the usual tire tread design 2, in the herein illustration consisting of parallel ribs. The band 1 has in it suitable heating elements such as electrical or steam heating conduits 3 connected in a manner not shown to an electrical circuit, or steam supply as the case may be.

This band 1 is supported on suitable platforms 4 each of which has on it a vertical flange 6 for locating the band in proper central position. Each platform 4 in turn is supported on a suitable lifting device such as the posts 7 on pistons 8 in opposite hydraulic or pneumatic cylinders 9. As pressure is admitted under the pistons 8, the same travel upwardly and the posts 7 will lift the platform 4 with the band 1 thereon. When the pressure is released from beneath the pistons 8, the entire platform 4 and the band 1 thereon are permitted to drop into the initial position shown in Fig. 1.

Another hydraulic or pneumatic lifting device is located generally intermediate between the cylinders 9 so as to be centered with respect to the band 1.

Figure 2:
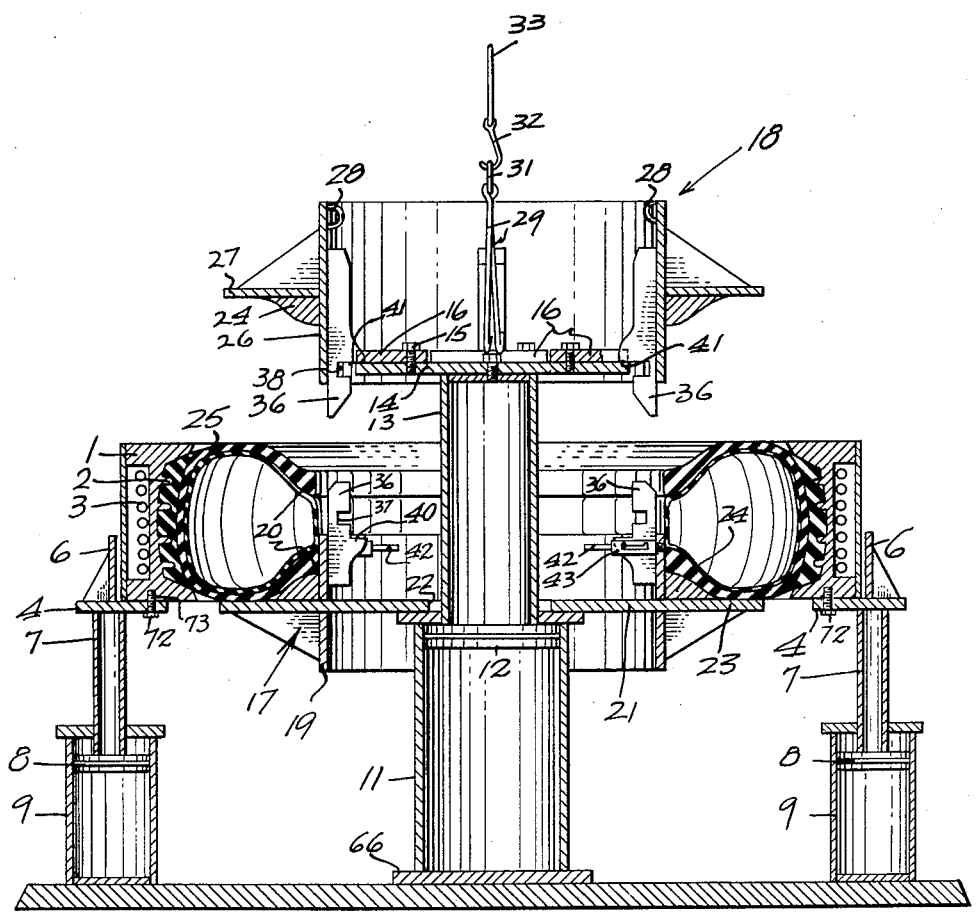
Fig. 2 is a cross-sectional view of our tire curing mold showing the mold band extended over the tire casing and the tire casing initially expanded into the mold with the upper section of the curing rim engaged for lowering into the tire casing.

This central lifting device includes a cylinder 11 in which works a piston 12. From the piston 12 extends a tubular post 13 on the top of which is mounted a preferably circular disc 14. On the disc 14 are pivoted on pivot screws 15 a plurality of, in the present instance four, locking and lifting fingers 16 which are adapted to be extended into the position shown in Fig. 4 for spreading of the tire beads in the manner hereinafter described, or to be contracted into an out of the way position as shown in Fig. 2 to permit the engagement and lowering of the upper rim section to be hereinafter described, or to be shifted into the rim locking position as shown particularly in Fig. 5.

Figure 3:
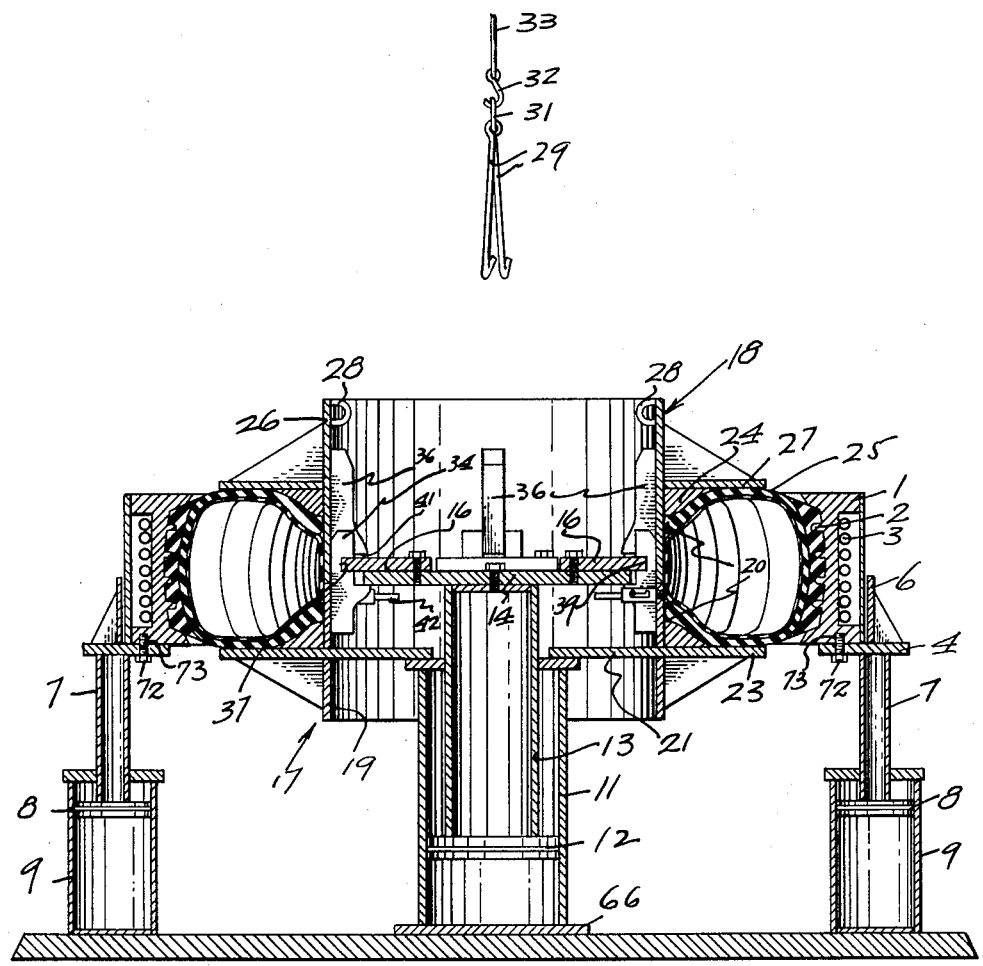
Fig. 3 is a cross-sectional of the mold showing the rim sections locked together for complete and tight engagement of the beads of the tire casing as the casing is expanded into the matrix design of the band mold.

On the top of the central cylinder 11 rests the lower half-section 17 of a curing rim. In the initial position an upper half-section 18 of the curing rim is suitably suspended as shown in Fig. 1 in an out of the way position. The lower half-section 17 of the curing rim includes a generally cylindrical body 19 from which extends an element such as a plate 21 having a central hole 22 to surround the lifting post 13 and to rest upon the top of the cylinder 11 as shown in Fig. 1. This plate 21 also extends outwardly of the cylinder body 19 to form a supporting flange 23 on which flange 23 is a bead engaging ring 24. This bead engaging ring 24 is solid and is so shaped as to conform to the contour of the exterior of the bead 20 and the adjacent portion of the sides of the tire casing 25. The tire casing 25 can be placed upon the flange 23 so that its bead 20 rests upon the bead engaging ring 24. The upper half section 18 of the curing rim also includes a cylindrical body 26 of the same diameter as the cylindrical body 19 of the lower section 17 so that it may abut and rest upon the top of the lower section particularly as shown in Fig. 3. This upper cylindrical body 26 has a flange 27 circularly extended around its outer periphery generally symmetrically to the flange 23 of the lower rim section 17. The flange 27 has thereon the bead engaging ring 24 contoured the same way as the bead engaging ring on the first flange 23 so as to engage the other or upper bead of the tire casing 25 substantially in the manner shown in Fig. 3.

A plurality of eyes 28 are provided near the top edge on the inside of the upper rim section 18 for engagement by suspension hooks 29. These suspension hooks 29 are pivotally suspended from a ring 31 which can be hung on a hook 32 suspended from any top overhanging structure on a line 33.

For the proper aligning and interlocking of the curing rim sections 17 and 18, there are provided in the lower section 18 four pairs of keeper ears 34 as shown in Fig. 1 and Fig. 5. The keeper ears 34 of each pair are spaced from one another to allow the insertion therebetween of a locking ear 36 extended inwardly from the inner periphery of the upper cylindrical rim body 26. Thus when the upper rim section 18 is lowered, it is aligned so that the locking ears 36 are inserted between the respective pairs of keeper ears 34. The keeper ears 34 have recesses or slots 37, spaced above the top edge of the lower rim cylindrical body 19. The locking ears 36 also have slots or recesses 38 therein spaced inwardly from the lower edge of the upper cylindrical body 26 at about the same distance as the distance between the slots 37 and the upper edge of the lower cylindrical body 19 so that when the cylindrical bodies 19 and 26 are in abutting relation, as shown in Fig. 3, the respective slots 37 and 38 are in registry. In this registering position the locking fingers 16 can be swung around the pivots into the position shown in Fig. 5 so that the locking lug 39 of each finger 16 engages the adjacent three slots, namely the two outside slots 37 and the middle slot 38 thereby locking the rim sections 17 and 18 together.

Each keeper ear 34 has a shoulder 39 projected therefrom on which the disc 14 rests so as to hold the fingers 16 in registry with the respective slots 37. On each locking gear 36 there is also a shoulder 41 aligned with the top edge of the slot 38. The shoulder 41 extends inwardly of the rim so that it can be engaged by the disc 14, as shown in Fig. 2, for the purpose of lifting the upper rim section from the hooks 29 and then lowering the section into the tire casing into the position as shown in Fig. 3.

For the initial operation and spreading the tire and for locking the lower beads 20 of the tire casing 25 in position while the beads 20 are spread, a latch pin 42 is slidable in a tube 43 radically fixed in the interior near the upper edge of the lower cylindrical body 19. The pin 42 can be extended outwardly beyond the outer periphery of the cylindrical body 19 into the position shown in Fig. 1 and also can be withdraw ninto the position shown in Fig. 6. A slot 44 on the tube 43 has an offset recess 46 at each end thereof. A projection 47 extends from the latch pin 42 into the slot 44 and as the latch is turned it may engage either of the recesses 46 to hold the latch pin 42 either in the withdrawn position as shown in Fig. 6, or in the bead gripping position shown in Fig. 1.

In the modified form shown in Fig. 7 the lower rim section 17 is supported on tubular legs 48. A traveling hub 49 is slidable on the exterior of the central tube 11. A plurality of arms 51 extend from the hub 49 outwardly. Each of the arms 51 has a series of transverse holes 52 to accommodate a securing pin 53 to hold a pair of bars 54 in position as shown in Fig. 8. Each pair of bars 54 straddles the adjacent arm 51. The bars 54 in each pair are connected by spaced transverse ribs 56 slidable over the opposite edges of the respective arms 51 so as to hold the pair of bars 54 at suitably inclined angular position and allow quick adjustment of the bars 54 so that the holes 57 in the bars 54 are in registry with the selected holes 52 in the arm 51 for the insertion of the pin 53. At the top of each bar 54 is recess to form a generally rectangular seat 58 generally fitting over the outer lower corner of the curing band 1. The curing band 1 can be laid onto the seats 58 and then can be moved and lowered with the arms 51 and hub 49.

A pneumatic cylinder 59 is mounted on a bracket 61 on the inside of the cylindrical body 19 of the lower rim section 17. A piston 62 works in the cylinder 59 so that it is raised by pneumatic pressure therein into the position shown in Fig. 7. The connecting rod 63 of this piston is connected to one of the arms 51 so that when the piston 62 is moved upwardly, the arm 51 is pulled upwardly and pulls the hub 49 and all the other arms 51 therewith upwardly in order to raise the band 1 over the contracted tire 25 as heretofore described.

The tubular legs 48 are supported on a suitable base 64 which also supports the base 66 of the central cylinder 11.

A suitable inner tube may be inserted either before the tire is placed on the mold, or may be inserted before the upper rim section is lowered.

In operation the tire is placed upon the flange 23 of the lower rim section 17 while the band 1 is in lowered position, on the mold support or platform as shown in Fig. 1, then the latch pins 42 are extended so as to clamp the lower bead 20 of the tire casing 25 onto the lower bead engaging ring 24. As the bead 20 is thus held, the fingers 16 on the disc 14 are extended so as to engage the inside of the upper bead 20. Then the central piston 12 is operated to lift the disc 14 and fingers 16 upwardly and thus spread the upper bead 20 apart from the lower bead as shown in Fig. 1. This results in contracting the circumference of the tire casing 25 to a diameter smaller than the inner diameter of the band 1. While the tire is held in its contracted position, the pistons 8 or the pistons 62, as the case may be, are operated to raise the band 1 to position shown in Fig. 2 and Fig. 7 respectively. And after the band 1 is raised to that position, the disc 14 is lowered and the fingers 16 are turned into an out of way position and thus the tire expands into the band 1 as shown in Fig. 2.

Thereafter, the central piston 12 is again operated to lift the disc 14 up to the upper rim section 18 as shown in Fig. 2, so that the disc 14 engages the shoulder 41 of the ears 36 and lifts the upper rim section 18 off the hooks 29 and then lowers the same onto the lower rim section 17 into the position shown in Fig. 3. As the respective ears 36 and 34 are aligned as heretofore described, the disc 14 is lowered to rest upon the lower shoulders 39 and the fingers 16 are turned into the position shown in Fig. 5 for positively interlocking the rim sections. As shown in Fig. 3 and Fig. 7 the bead engaging rings 24 engage the contour of beads and hold the tire securely in the band. The flanges beyond these bead engaging rings 24 restrain the sides of the tire at areas spaced from the band 1.

Thereafter, the tire tread is cured for the desired period. In order to remove the cured tire, the fingers 16 and the disc 14 are withdrawn from the locking position and the disc 14 is engaged again with the shoulders 41 of the upper ears 36 and the upper half section 16 is pushed up into the position shown in Fig. 2 and the hooks 29 are engaged with the eyes 28 shown in Fig. 1 to suspend the upper half rim section 18 in an out of the way position.

Then the disc 14 is again lowered and the fingers 16 are extended so as to engage the inside of the upper bead 20. The latch pins 42 are again extended to lock the lower bead 20 and the central piston 12 is operated to spread the beads 20 apart and to contract the tire casing 25 as shown in Fig. 1. After the tire casing is thus freed from the band 1, then the pistons 8 or the piston 62 as the case may be, are released from pressure to allow the band 1 to lower by gravity into the initial position shown in Fig. 1 and thereby allow the removal of the cured tire casing from the mold altogether.

The device is simple in construction and entirely obviates the need for separate spreaders and obviates the necessity of carrying bands over to a tire casing and holding the tire in spread position and then carrying the tire and the band back to a mold or heater for the purpose of curing. In the present device the mold band, the curing rim and the tire spreading device are one and the same unit and all the elements of the same cooperate to accomplish the single result of the easy removal and insertion of the tire casing positively into the mold directly and accomplish efficient handling of the tire for retreading, recapping or the like operations.

For accurately holding the matrix band 1 in centered position on the arms 54 and in the seats 58 of the modified form shown in Figs. 7 and 8, circumferentially spaced locking hooks 67 are extended downwardly from the bottom of the matrix band 1. Each hook 67 is held on a stem 68 which is suitably secured in the bottom of the curing band 1. The circumferential spacing between the hooks 67 corresponds to the circumferential spacing between the sets of bars 54 so that each hook 67 projects between the adjacent pair of bars 54 as shown in Fig. 8. The bars 54 have aligned holes 69 located so as to be in registry with the hooks 67 when the curing band 1 is in correctly centered position. A pin 71 extended through the holes 69 and the hook 67 locks the hooks 67 in position and thereby locks the curing band 1 in correctly centered position. This facilitates the relative operation of the curing band.

In the form shown in Figs. 1 to 3 inclusive, a bolt 72 is screwed through each platform 4 into the preformed threaded holes 73 in the bottom of the curing band 1. The properly spaced bolts 72 and the holes 73 determine the correct position for the curing band 1 and hold the latter in said position.

We claim:

1. A tire curing device comprising a central support, a lower rim section resting on said support and adapted to support a tire casing thereon, an adjustable band support device movable relatively to said support, a mold band held on the adjustable band support device generally concentrically with respect to said lower rim section and initially below the plane of said rim section, means related to said band support device to move said mold band to the level of and over the tire on said lower rim section, an upper rim section adapted to be inserted into the tire to complement said lower rim section, means on said rim sections to engage the bead and adjacent portions of the sides of the tire, and a spreading device related to and adjustable with respect to said central support for selectively engaging the upper bead of the tire and spreading the beads apart so as to contract the periphery of the tire casing to smaller circumference than the inner circumference of said mold band so as to permit the raising of the mold band over said tire, and means on said spreading device to engage and carry said upper rim section into and out of said tire casing.

2. A tire curing device comprising a central support, a lower rim section resting on said support and adapted to support a tire casing thereon, an adjustable band support device movable relatively to said support, a mold band held on the adjustable band support device generally concentrically with respect to said lower rim section and initially below the plane of said rim section, means related to said band support device to move said mold band to the level of and over the tire on said lower rim section, an upper rim section adapted to be inserted into the tire to complement said lower rim section, means on said rim sections to engage the bead and adjacent portions of the sides of the tire, and a spreading device related to and adjustable with respect to said central support for selectively engaging the upper bead of the tire and spreading the beads apart so as to contract the periphery of the tire casing to smaller circumference than the inner circumference of said mold band so as to permit the raising of the mold band over said tire, and means on said spreading device to engage and carry said upper rim section into and out of said tire casing, and releasable locking means on said lower rim section for engaging and holding the adjacent lower bead of the tire, said spreading device engaging and forcing the upper beads of the tire away from said lower bead for contracting the periphery of said tire.

3. A tire curing device comprising a central support, a lower rim section resting on said support and adapted to support a tire casing thereon, an adjustable band support device movable relatively to said support, a mold band held on the adjustable band support device generally concentrically with respect to said lower rim section and initially below the plane of said rim section, means related to said band support device to move said mold band to the level of and over the tire on said lower rim section, an upper rim section adapted to be inserted into the tire to complement said lower rim section, means on said rim sections to engage the bead and adjacent portions of the sides of the tire, and a spreading device related to and adjustable with respect to said central support for selectively engaging the upper bead of the tire and spreading the beads apart so as to contract the periphery of the tire casing to smaller circumference than the inner circumference of said mold band so as to permit the raising of the mold band over said tire, complemental elements on said upper and lower rim sections forming keepers for interlocking said sections, and lock elements on said spreading means adjustable to engage and interlock said keepers for holding the rim sections together.

4. A tire curing device comprising a central support, a lower rim section resting on said support and adapted to support a tire casing thereon, an adjustable band support device movable relatively to said support, a mold band held on the adjustable band support device generally concentrically with respect to said lower rim section and initially below the plane of said rim section, means related to said band support device to move said mold band to the level of and over the tire on said lower rim section, an upper rim section adapted to be inserted into the tire to complement said lower rim section, means on said rim sections to engage the bead and adjacent portions of the sides of the tire, and a spreading device related to and adjustable with respect to said central support for selectively engaging the upper bead of the tire and spreading the beads apart so as to contract the periphery of the tire casing to smaller circumference than the inner circumference of said mold band so as to permit the raising of the mold band over said tire, complemental elements on said upper and lower rim sections forming keepers for interlocking said sections, and lock elements on said spreading means adjustable to engage and interlock said keepers for holding the rim sections together, said lock elements being adapted to engage said upper rim section for carrying said upper rim section into and out of the tire and said lock elements being adapted to be extended to engage the inside of the upper bead of the tire for spreading the same.

5. In combination a central post, a platform on said post, means on said post for raising and lowering said platform, a generally cylindrical lower rim section resting on said post being adapted to support a tire thereon, a generally cylindrical removable upper rim section complementing said lower rim section, a circular flange extending radially outwardly from each rim section for engaging the adjacent side of the tire, releasable clamping means on said lower rim section to clamp the adjacent bead of a tire to said lower rim section, and a device on said platform for engaging the upper bead of the tire for pushing it away from the lower bead when said platform is raised so as to contract the tire periphery, a support device generally concentric to said post, a mold band held on said support concentrically to said rim and tire, the initial position of said support device and mold band being below the level of said lower rim section to hold said mold band clear of the tire on said rim section, and means for raising said support device axially with respect to said post to shift said mold band over the contracted tire on said rim section.

6. A tire curing device comprising a central support, a generally cylindrical lower rim section resting on said support and adapted to support a tire casing thereon, an adjustable band support device movable relatively to said support, a mold band held on the adjustable band support device generally concentrically with respect to said lower rim section and initially below the plane of said rim section, means related to said band support device to move said mold band to the level of and over the tire on said lower rim section, a generally cylindrical upper rim section adapted to be inserted into the tire to complement said lower rim section, a radial flange on the outer periphery of each rim section to engage adjacent portions of the sides of the tire, and a spreading device related to and adjustable with respect to said central support for selectively engaging the upper bead of the tire and spreading the beads apart so as to contract the periphery of the tire casing to smaller circumference than the inner circumference of said mold band so as to permit the raising of the mold band over said tire, said band moving means including a hub slidable on said band support, a plurality of arms extended from said hub and adapted to hold and center said mold band with respect to said rim section, and means selectively to shift said hub and arms together for raising or lowering of said tire and said support.

7. A tire curing device comprising a central support, a generally cylindrical lower rim section resting on said support and adapted to support a tire casing thereon, an adjustable band support device movable relatively to said support, a mold band held on the adjustable band support device generally concentrically with respect to said lower rim section and initially below the plane of said rim section, means related to said band support device to move said mold band to the level of and over the tire on said lower rim section, a generally cylindrical upper rim section adapted to be inserted into the tire to complement said lower rim section, a radial flange on the outer periphery of each rim section to engage adjacent portions of the sides of the tire, and a spreading device related to and adjustable with respect to said central support for selectively engaging the upper bead of the tire and spreading the beads apart so as to contract the periphery of the tire casing to smaller circumference than the inner circumference of said mold band so as to permit the raising of the mold band over said tire, said band moving means including a hub slidable on said band support, a plurality of arms extended from said hub and adapted to hold and center said mold band with respect to said rim section, and means selectively to shift said hub and arms together for raising or lowering of said tire and said support, means on said matrix band to interlock with said arms, and releasable means to lock said interlocking elements to said arms.

8. A tire curing device comprising a central support, a generally cylindrical lower rim section resting on said support and adapted to support a tire casing thereon, an adjustable band support device movable relatively to said support, a mold band held on the adjustable band support device generally concentrically with respect to said lower rim section and initially below the plane of said rim section, means related to said band support device to move said mold band to the level of and over the tire on said lower rim section, a generally cylindrical upper rim section adapted to be inserted into the tire to complement said lower rim section, a radial flange on the outer periphery of each rim section to engage adjacent portions of the sides of the tire, and a spreading device related to and adjustable with respect to said central support for selectively engaging the upper bead of the tire and spreading the beads apart so as to contract the periphery of the tire casing to smaller circumference than the inner circumference of said mold band so as to permit the raising of the mold band over said tire, said band moving means including a hub slidable on said band support, a plurality of arms extended from said hub and adapted to hold and center said mold band with respect to said rim section, and means selectively to shift said hub and arms together for raising or lowering of said tire and said support, a seat formed on each arm for engaging the mold band, a locating and locking element extended from said mold band into said seat, and releasable means to lock said locking element to said arm.

References Cited in the file of this patent

UNITED STATES PATENTS

| | | |
|---|---|---|
| 1,362,729 | Momitsa | Dec. 21, 1920 |
| 2,282,578 | Hawkinson | May 12, 1942 |
| 2,302,133 | Maze | Nov. 17, 1942 |
| 2,418,584 | Hawkinson | Apr. 8, 1947 |
| 2,475,579 | Napier | July 5, 1949 |
| 2,480,578 | Hodges | Aug. 30, 1949 |